US011222417B2

(12) United States Patent
Oishi

(10) Patent No.: US 11,222,417 B2
(45) Date of Patent: Jan. 11, 2022

(54) DATA STRUCTURE FOR CREATING IMAGE-PROCESSING DATA AND METHOD FOR CREATING IMAGE-PROCESSING DATA

(71) Applicant: FUJI CORPORATION, Chiryu (JP)

(72) Inventor: Nobuo Oishi, Kosai (JP)

(73) Assignee: FUJI CORPORATION, Chiryu (JP)

( * ) Notice: Subject to any disclaimer, the term of this patent is extended or adjusted under 35 U.S.C. 154(b) by 46 days.

(21) Appl. No.: 16/483,575

(22) PCT Filed: Mar. 6, 2017

(86) PCT No.: PCT/JP2017/008767
§ 371 (c)(1),
(2) Date: Aug. 5, 2019

(87) PCT Pub. No.: WO2018/163242
PCT Pub. Date: Sep. 13, 2018

(65) Prior Publication Data
US 2020/0027205 A1    Jan. 23, 2020

(51) Int. Cl.
*G06T 7/00* (2017.01)
*G06T 7/70* (2017.01)
(Continued)

(52) U.S. Cl.
CPC ............. *G06T 7/001* (2013.01); *B25J 9/1697* (2013.01); *G06K 9/6201* (2013.01); *G06T 7/70* (2017.01);
(Continued)

(58) Field of Classification Search
CPC . G06T 7/001; G06T 7/70; G06T 2207/30164; G06T 7/12; G06T 7/136;
(Continued)

(56) References Cited

U.S. PATENT DOCUMENTS

2007/0282485 A1* 12/2007 Nagatsuka ............. B25J 9/1671
703/7
2013/0211593 A1*  8/2013 Domae .................. B25J 9/1612
700/258
(Continued)

FOREIGN PATENT DOCUMENTS

CN        104057459 B   *  2/2017  ............. B25J 13/08
JP         2004-362018 A    12/2004
(Continued)

OTHER PUBLICATIONS

International Search Report dated May 16, 2017 in PCT/JP2017/008767 filed on Mar. 6, 2017.

*Primary Examiner* — Kim Y Vu
*Assistant Examiner* — Molly Delaney
(74) *Attorney, Agent, or Firm* — Oblon, McClelland, Maier & Neustadt, L.L.P.

(57) ABSTRACT

Data structure for image-processing data is for creating image-processing data necessary for performing image processing on captured images of multiple workpieces when an articulated robot extracts a workable target workpiece from among multiple supplied workpieces. The data structure includes workpiece shape data for recognizing a target workpiece by pattern matching and tool data configured to check whether there is interference between a tool mounted on the articulated robot and a peripheral workpiece. The data structure is configured such that the combination of the workpiece shape data and the tool data can be rearranged for each workpiece or for each tool.

20 Claims, 13 Drawing Sheets

(51) Int. Cl.
  *G06K 9/62* (2006.01)
  *B25J 9/16* (2006.01)
(52) U.S. Cl.
  CPC ............... *G06K 2209/19* (2013.01); *G06T 2207/30164* (2013.01)
(58) Field of Classification Search
  CPC ... G06T 7/74; G06T 1/00; B25J 9/1697; B25J 9/0093; B25J 15/04; B25J 19/023; G06K 9/6201; G06K 2209/19; G05B 2219/40053
  See application file for complete search history.

(56) References Cited

U.S. PATENT DOCUMENTS

| | | | |
|---|---|---|---|
| 2015/0003678 A1* | 1/2015 | Watanabe | 382/103 |
| 2017/0129066 A1* | 5/2017 | Okuda | B25J 11/006 |

FOREIGN PATENT DOCUMENTS

| | | | | |
|---|---|---|---|---|
| JP | 2015-44274 A | | 3/2015 | |
| JP | 2017-30135 A | | 2/2017 | |
| JP | 2017030135 A | * | 2/2017 | ............ B25J 9/1602 |

* cited by examiner

FIG. 4

| MODEL FILE | CONTENT |
|---|---|
| WORKPIECE SHAPE MODEL | CONTOUR SHAPE OF WORKPIECE, PICKUP POSITION PP OF WORKPIECE |
| PICKUP TOOL MODEL | INTERFERENCE CHECK REGION AI FOR CHECK INTERFERENCE BETWEEN PICKUP TOOL AND WORKPIECE |
| IMAGE PROCESSING SETTING MODEL | SEQUENCE OF IMAGE PROCESSING, PARAMETER SETTING |
| IMAGE PROCESSING DATA | INTEGRATED IMAGE PROCESSING DATA COMBINING THREE MODEL FILES |

DATA STRUCTURE FOR CREATING IMAGE-PROCESSING DATA AND METHOD FOR CREATING IMAGE-PROCESSING DATA

TECHNICAL FIELD

The present description discloses a data structure for creating image-processing data and a method for creating image-processing data.

BACKGROUND ART

Conventionally, an industrial articulated robot capable of working on a workpiece has been known (for example, see Patent Literature 1).

PATENT LITERATURE

Patent Literature 1: JP-A-2004-362018

BRIEF SUMMARY

Technical Problem

Since the production of a large number of product types is often mixed in a modern multiproduct variable cell production line, it is desirable to have a large number of components (workpieces) of various product types supplied at the same time without changeover, and the method for arranging and supplying the workpieces is a major concern. One of the basic operations of an articulated robot is the operation of picking up and conveying a target workpiece. In the industrial robot in the related art, in order to facilitate picking up a workpiece with the articulated robot, the workpieces are often supplied in a state in which the direction and position of each workpiece are aligned by using a dedicated supply device. However, a dedicated supply device is not suitable for multiproduct variable cell production lines because it requires a dedicated design for each workpiece, and the space and costs of installation are not small.

For this reason, a simpler form of supplying workpieces is desired in which the workpieces are simply placed separately on a general-purpose supply device such as a case (component box) or a small conveyor so that a larger number of workpieces can be supplied with a small installation area without using a dedicated supply device. Dedicated supply devices supply workpieces at predetermined positions and orientations each time. Therefore, the articulated robot need only perform a predetermined pickup operation. However, in a general-purpose supply device, there are cases in which workpieces are loosely placed, the positions and orientations at which the workpieces are arranged are uncertain, and picking up a workpiece is impossible due to interference with workpieces that are not the pickup target. Therefore, it is necessary for the articulated robot to recognize the arrangement state of the workpiece and control the arm so as to obtain an appropriate pickup point and pickup orientation.

The arrangement state of the workpiece is automatically recognized by camera imaging and image processing in an image-processing device attached to the robot control device. The image-processing device recognizes the arrangement condition of the workpiece, that is, the position, direction, and orientation of the target workpiece and the interference state with non-target workpieces, and determines whether the target workpiece can be picked up. Generation of image-processing data for realizing such image processing usually requires a large amount of labor. However, in a production line for multiproduct variable production, efficient production of more product types by switching product types within a short time is required, and it is desirable to easily generate image-processing data of more product types in a short time.

A main object of the present disclosure is to provide a data structure or a creation method capable of creating image-processing data for various product types with a small amount of labor.

Solution to Problem

The present disclosure employs the following means in order to achieve the above-mentioned main object.

The data structure for image-processing data creation of the present disclosure is a data structure for creating image-processing data necessary for performing image processing on captured images of multiple workpieces when an articulated robot extracts a workable target workpiece from among multiple supplied workpieces. The data structure includes workpiece shape data for recognizing the target workpiece by pattern matching and tool data for checking whether there is interference between a tool and a peripheral workpiece, and a combination of the workpiece shape data and the tool data can be rearranged for each workpiece or for each tool.

As a result, the data creator only needs to create the setting data once for the shared item, and thereafter, the setting data can be developed into various product types using the shared data. As a result, image-processing data for various product types can be created with less labor.

BRIEF DESCRIPTION OF DRAWINGS

FIG. 4 is an explanatory diagram showing a data structure of image-processing data.

DESCRIPTION OF EMBODIMENTS

Next, embodiments of the present disclosure will be described with reference to the drawings.

Figure 1:
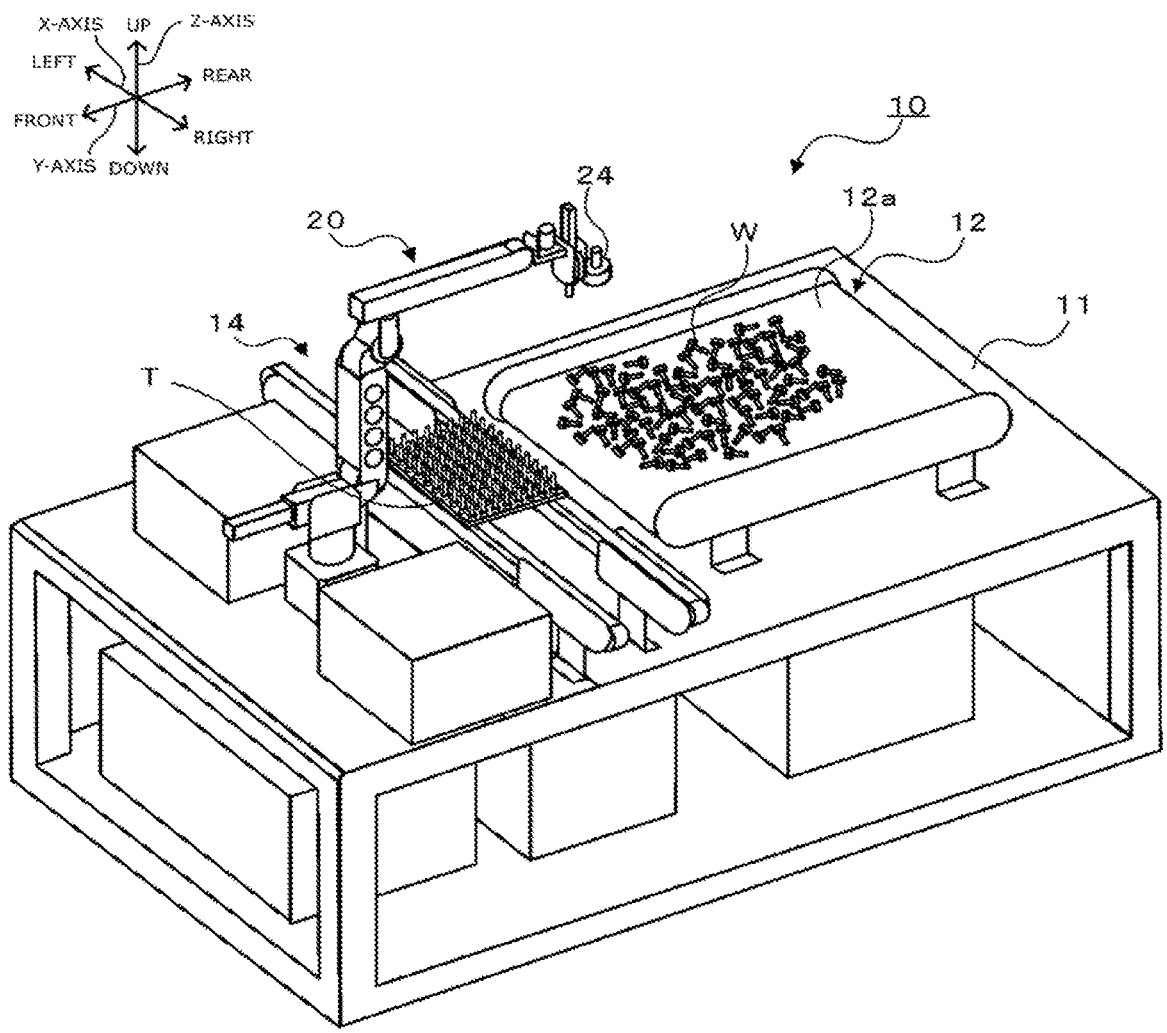
FIG. 1 is a configuration diagram showing a schematic configuration of robot system 10.
Figure 2:
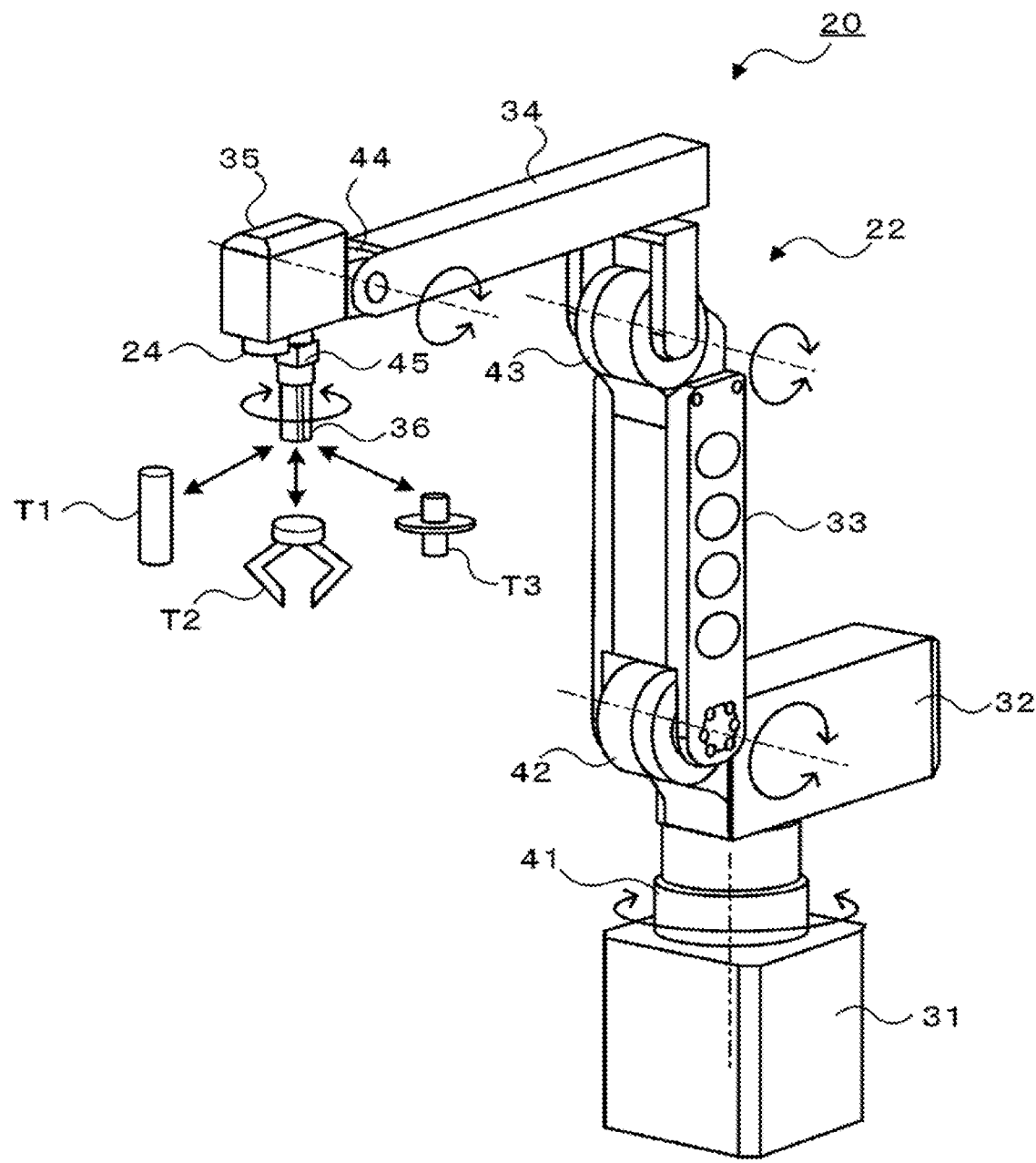
FIG. 2 is a configuration diagram showing a schematic configuration of robot 20.
Figure 3:
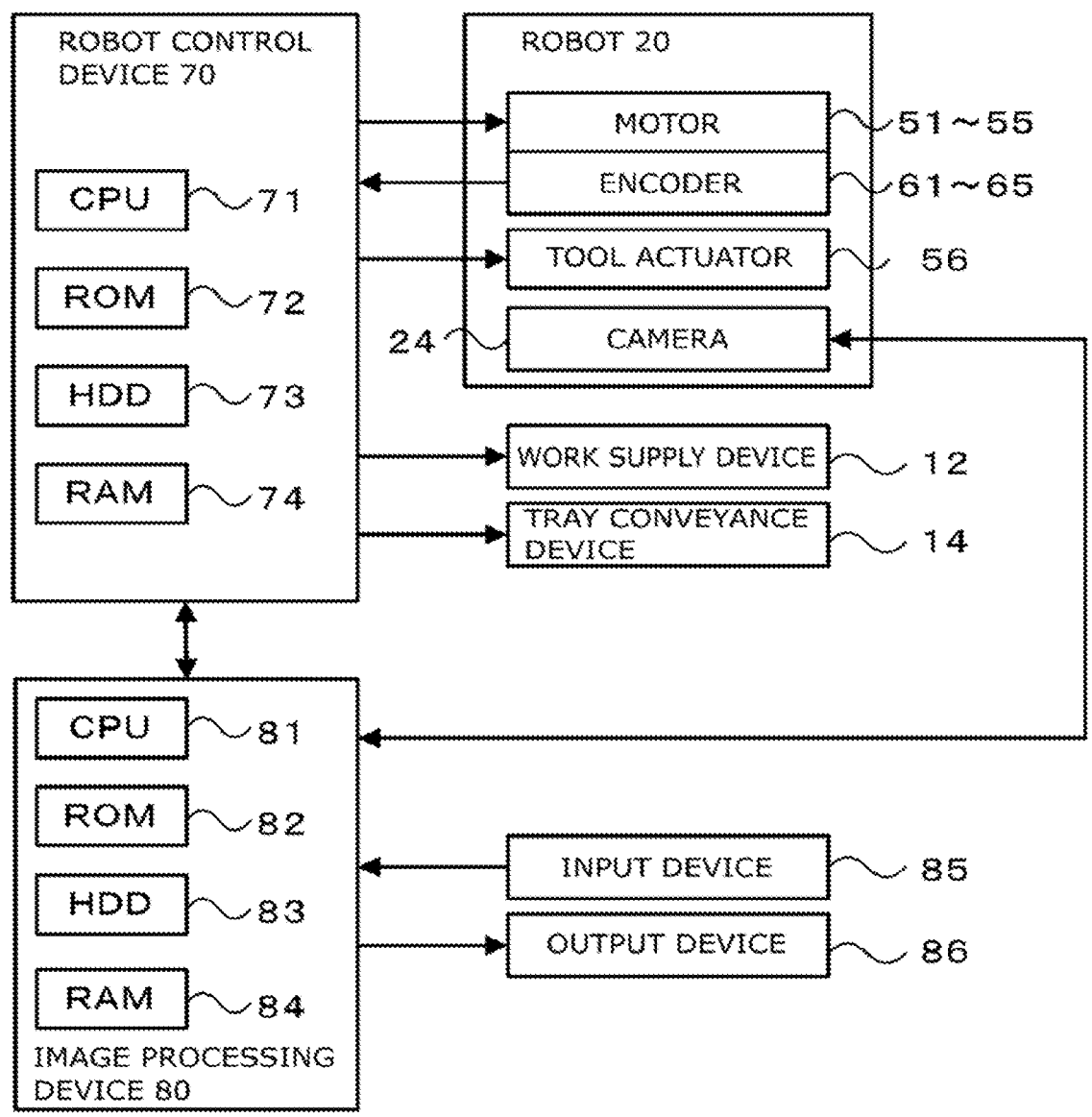
FIG. 3 is a block diagram showing electrical connections between robot 20, robot control device 70, and image-processing device 80.

FIG. 1 is a configuration diagram showing a schematic configuration of robot system 10. FIG. 2 is a configuration diagram showing a schematic configuration of robot 20. FIG. 3 is a block diagram showing electrical connections between robot 20, robot control device 70, and image-processing device 80. In FIG. 1, the left-right direction is the X-axis direction, the front-rear direction is the Y-axis direction, and the up-down direction is the Z-axis direction.

Robot system 10 includes robot 20, robot control device 70, and image-processing device 80. In the present embodiment, robot system 10 is configured as a pick-and-place system that picks up workpiece W supplied by work supply device 12, and arranges and places picked up workpiece W on tray T conveyed by tray conveyance device 14. The robot system is not limited to the pick-and-place system and can be applied to any work system as long as work is performed on workpiece W using robot 20.

Robot 20 includes five-axis vertical articulated arm (hereinafter, referred to as arm) 22. Arm 22 has six links (first to sixth links 31 to 36) and five joints (first to fifth joints 41 to 45) for rotatably or pivotally connecting each link. Each of the joints (first to fifth joints 41 to 45) is provided with motors (servomotors) 51 to 55 for driving the corresponding joint and encoders (rotary encoders) 61 to 65 for detecting the rotational position of the corresponding motor.

Multiple types of pickup tools T1 to T3 as end effectors are detachably attached to the tip link (sixth link 36) of arm 22. In the present embodiment, pickup tool T1 is an electromagnetic chuck that picks up workpiece W made of a magnetic material with an electromagnet. Pickup tool T2 is a mechanical chuck having a pair of clamp claws movable between a nearby position for holding workpiece W and a separation position for releasing workpiece W. Pickup tool T3 is a suction nozzle that picks up workpiece W by negative pressure. The pickup tool to be mounted on the tip link is appropriately selected in accordance with the shape and material of workpiece W to be picked up.

Camera 24 is attached to a tip portion (fifth link 35) of arm 22. Camera 24 captures an image of each workpiece W in order to recognize the position and orientation of each workpiece W supplied by work supply device 12, and captures an image of tray T in order to recognize the position of tray T conveyed by tray conveyance device 14.

The proximal link (first link 31) of arm 22 is fixed to work table 11. Work supply device 12, tray conveyance device 14, and the like are disposed on work table 11. In the present embodiment, work supply device 12 is configured by a belt conveyor device including conveyor belt 13 laid across a driving roller and a driven roller, which are arranged apart from each other in the front-rear direction (Y-axis direction). Multiple workpieces W are separately placed on conveyor belt 13, and work supply device 12 supplies multiple workpieces W on conveyor belt 13 from the rear to the front by rotating and driving the driving roller. The work supply device may be a case supply device for supplying multiple workpieces accommodated in cases (component boxes), on a per case basis, instead of the belt conveyor device or in addition to the belt conveyor device. Tray conveyance device 14 is configured by a belt conveyor device and conveys tray T in a direction orthogonal to the supply direction of workpiece W (X-axis direction), and positions and holds tray T at a substantially central position.

Robot control device 70 is configured as a microprocessor centered on CPU 71 and includes ROM 72, HDD 73, RAM 74, an input and output interface (not shown), a communication interface (not shown), and the like in addition to CPU 71. Detection signals from encoders 61 to 65 and the like are input to robot control device 70. Robot control device 70 outputs control signals to work supply device 12, tray conveyance device 14, motors 51 to 55, tool actuator 56, and the like. Tool actuator 56 is an actuator for driving a pickup tool mounted on robot 20.

Robot control device 70 performs pickup process for causing robot 20 to pick up workpiece W and placing process for placing picked up workpiece W on tray T by driving and controlling motors 51 to 55 of robot 20. Specifically, the pickup process is performed as follows. That is, robot control device 70 acquires the target position of each joint of arm 22 corresponding to the target pickup position and orientation. Subsequently, robot control device 70 drives and controls the corresponding motors 51 to 55 so that the positions of the respective joints coincide with the acquired target positions. Robot control device 70 controls tool actuator 56 so that workpiece W is picked up by the pickup tool. Specifically, the placing process is performed as follows. That is, robot control device 70 acquires the target position of each joint of arm 22 corresponding to the target place position and orientation. Subsequently, robot control device 70 drives and controls the corresponding motors 51 to 55 so that the positions of the respective joints coincide with the acquired target positions. Then, robot control device 70 controls tool actuator 56 so that picked up workpiece W is placed (i.e., pickup of workpiece W is released).

Image-processing device 80 is configured as a microprocessor centered on CPU 81 and includes ROM 82, HDD 83, RAM 84, an input and output interface (not shown), a communication interface (not shown), and the like in addition to CPU 81. An image signal from camera 24, an input signal from input device 85, and the like are input to image-processing device 80. Image-processing device 80 outputs a drive signal to camera 24, an output signal to output device 86, and the like. Input device 85 is, for example, an input device such as a keyboard or a mouse, on which an operator performs an input operation. Output device 86 is a display device for displaying various information, such as a liquid crystal display, for example. Image-processing device 80 and robot control device 70 are communicably connected and exchange control signals and data with each other.

Image-processing device 80 transmits a control signal to robot control device 70 to move arm 22 (camera 24) to the imaging point of workpiece W supplied by work supply device 12, drives camera 24 to image workpiece W, and inputs the obtained image signal (captured image). Subsequently, image-processing device 80 processes the input image signal to recognize workpiece W in the captured image. Then, image-processing device 80 extracts a target workpiece, which can be picked up, from among recognized workpieces W, determines a target position and a target orientation of a pickup tool for picking up the target workpiece, and transmits the target position and the target orientation to robot control device 70. Such processing is performed in accordance with an image-processing sequence based on image-processing data. FIG. 4 is an explanatory diagram showing a data structure of image-processing data. The image-processing data is configured as integrated image-processing data in which a workpiece shape model, a pickup tool model, and an image processing setting model are combined.

Figure 5A:
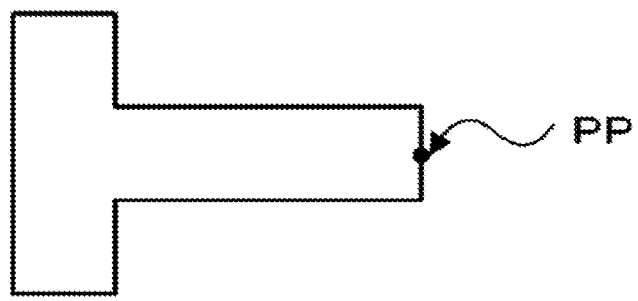
FIG. 5A is an explanatory diagram showing a workpiece shape model of a bolt-shaped workpiece.
Figure 5B:
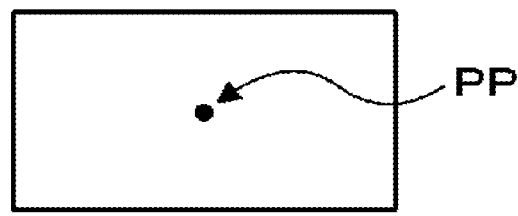
FIG. 5B is an explanatory diagram showing a workpiece shape model of a cylindrical workpiece.

The workpiece shape model is a template for pattern matching when recognizing workpiece W from the captured image. The workpiece shape model includes the contour shape of workpiece W and pickup position PP of workpiece W. FIG. 5A is a workpiece shape model of a bolt-shaped workpiece, and FIG. 5B is a workpiece shape model of a cylindrical workpiece. In FIGS. 5A and 5B, the solid line indicates the contour shape of the workpiece, and the round dot indicates pickup position PP of the workpiece. The contour shape of workpiece W of the workpiece shape model can be created by capturing an image of workpiece W arranged in the orientation at the time of picking up with camera 24 and extracting the contour of workpiece W from the captured image obtained. Pickup position PP of the workpiece shape model can be created by inputting positional coordinates with respect to the contour shape of created workpiece W using input device 77. Since the workpiece shape model differs for each product type, a workpiece shape model is created for each product type.

The pickup tool model includes interference check region AI for checking whether the pickup tool interferes with a peripheral workpiece when picking up a target workpiece with the pickup tool. Interference check region AI can be created by the shape of the tip end of the pickup tool and the shape of the range of motion (range of influence) of the pickup tool. Since the pickup tool model is different for each pickup tool type, a pickup tool model is created for each pickup tool type.

Figure 6A:
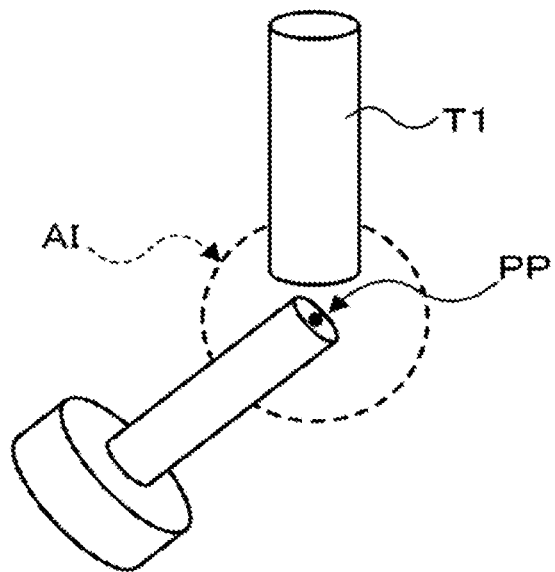
FIG. 6A is an explanatory diagram showing how a bolt-shaped workpiece is picked up with pickup tool T1 (electromagnetic chuck).
Figure 7A:
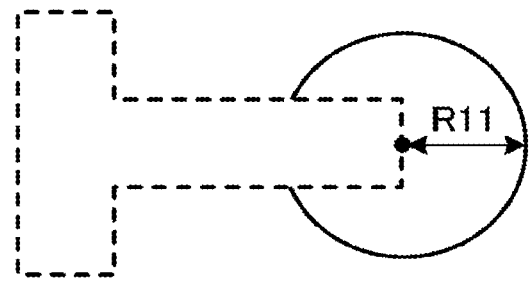
FIG. 7A is an explanatory diagram showing an example of a pickup tool model for an electromagnetic chuck.

FIG. 6A shows how a bolt-shaped workpiece is picked up by pickup tool T1 (electromagnetic chuck), and FIG. 7A shows a pickup tool model for the electromagnetic chuck. As shown in FIGS. 6A and 7A, the pickup tool model (interference check region AI) of the electromagnetic chuck is created as a circular region in which the magnetic force of the electromagnetic chuck expands from pickup position PP. The circular region may be defined by radius dimension R11 of the circle.

Figure 6B:
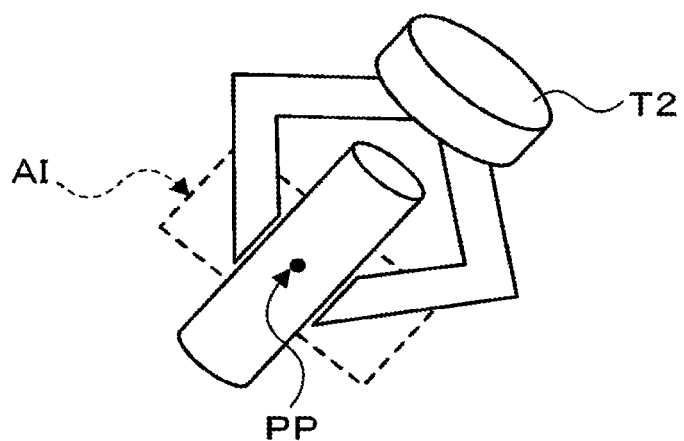
FIG. 6B is an explanatory diagram showing how a cylindrical workpiece is picked up by pickup tool T2 (mechanical chuck).
Figure 7B:
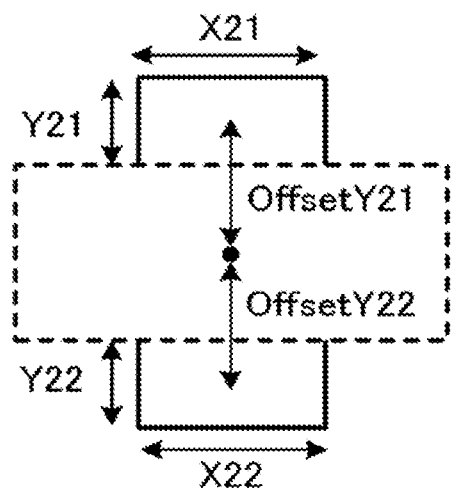
FIG. 7B is an explanatory diagram showing an example of a pickup tool model for a mechanical chuck.

FIG. 6B shows how a cylindrical workpiece is picked up by pickup tool T2 (mechanical chuck), and FIG. 7B shows a pickup tool model for the mechanical chuck. As shown in FIGS. 6B and 7B, the mechanical chuck pickup tool model (interference check region AI) is created as two rectangular regions forming a moving region in which a pair of clamping claws of the mechanical chuck moves between a nearby position (pickup position) and a separation position (pickup release position) with pickup position PP at its center. The center coordinate of each rectangular region can be defined by offset amounts OffsetY21 and OffsetY22 from pickup position PP. The outer shape of each rectangular region can be defined by long side dimensions X21 and X22 and short side dimensions Y21 and Y22.

Figure 6C:
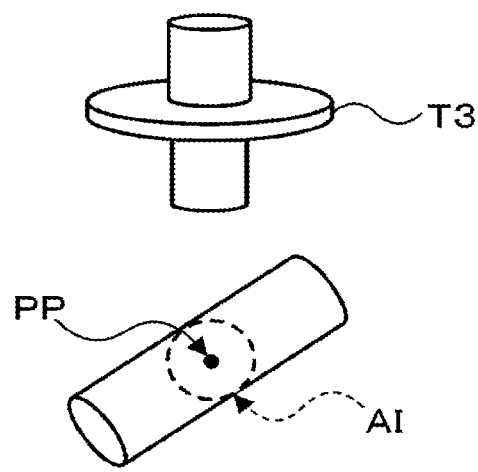
FIG. 6C is an explanatory diagram showing how a bolt-shaped workpiece is picked up by pickup tool T3 (suction nozzle).
Figure 7C:
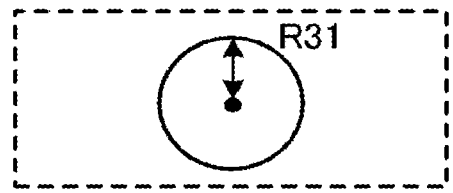
FIG. 7C is an explanatory diagram showing an example of a pickup tool model for a suction nozzle.

FIG. 6C shows how a cylindrical workpiece is picked up by pickup tool T3 (suction nozzle), and FIG. 7C shows a pickup tool model for the suction nozzle. As shown in FIGS. 6C and 7C, the pickup tool model (interference check region AI) of the suction nozzle is created as a circular region in which the negative pressure of the suction nozzle expands with the pickup position at the center. The circular region may be defined by radius dimension R31 of the circle.

Figure 8A:
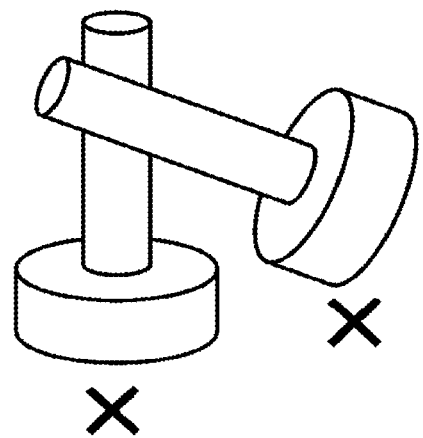
FIG. 8A is an explanatory diagram showing whether picking up a workpiece is possible.
Figure 8B:
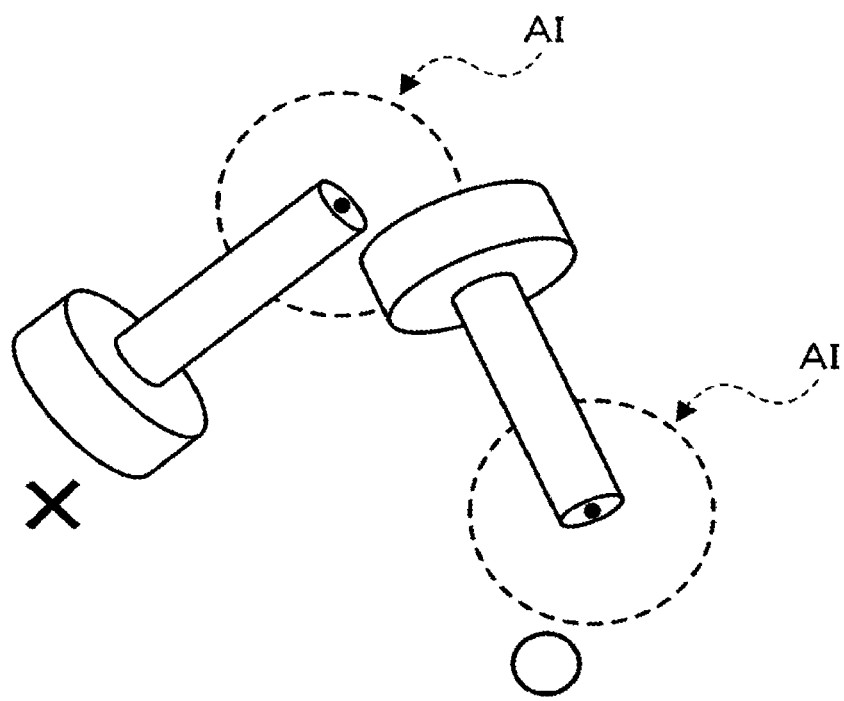
FIG. 8B is an explanatory diagram showing whether picking up a workpiece is possible.
Figure 8C:
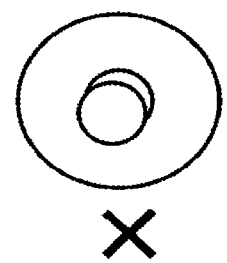
FIG. 8C is an explanatory diagram showing whether picking up a workpiece is possible.

FIG. 8A, FIG. 8B and FIG. 8C are explanatory diagrams showing whether picking up a workpiece is possible. FIG. 8A shows a state in which screw sections (cylindrical sections) of two bolts overlap each other. In this state, since the contour shape of the bolt cannot be recognized in the captured image, image-processing device 80 determines that picking up workpiece W is impossible. FIG. 8B shows a state in which the screw tip of one of the two bolts and the head of the other bolt are close to each other. In this state, image-processing device 80 recognizes the contour shapes of the two bolts in the captured image. However, image-processing device 80 determines that the bolt on the left side of FIG. 8B cannot be picked up because the head of the bolt on the right side of FIG. 8B intrudes into interference check region AI of the bolt on the left side of FIG. 8B. On the other hand, image-processing device 80 determines that the bolt on the right side of FIG. 8B can be picked up because the peripheral bolt does not enter interference check region AI of the bolt on the right side of FIG. 8B. FIG. 8C shows a state in which the screw tip of a bolt is standing. The bolt in FIG. 8C does not interfere with a peripheral bolt, but has a special orientation different from normal. Therefore, image-processing device 80 cannot recognize the contour shape of the bolt in the captured image and determines that picking up workpiece W is impossible.

Figure 9:
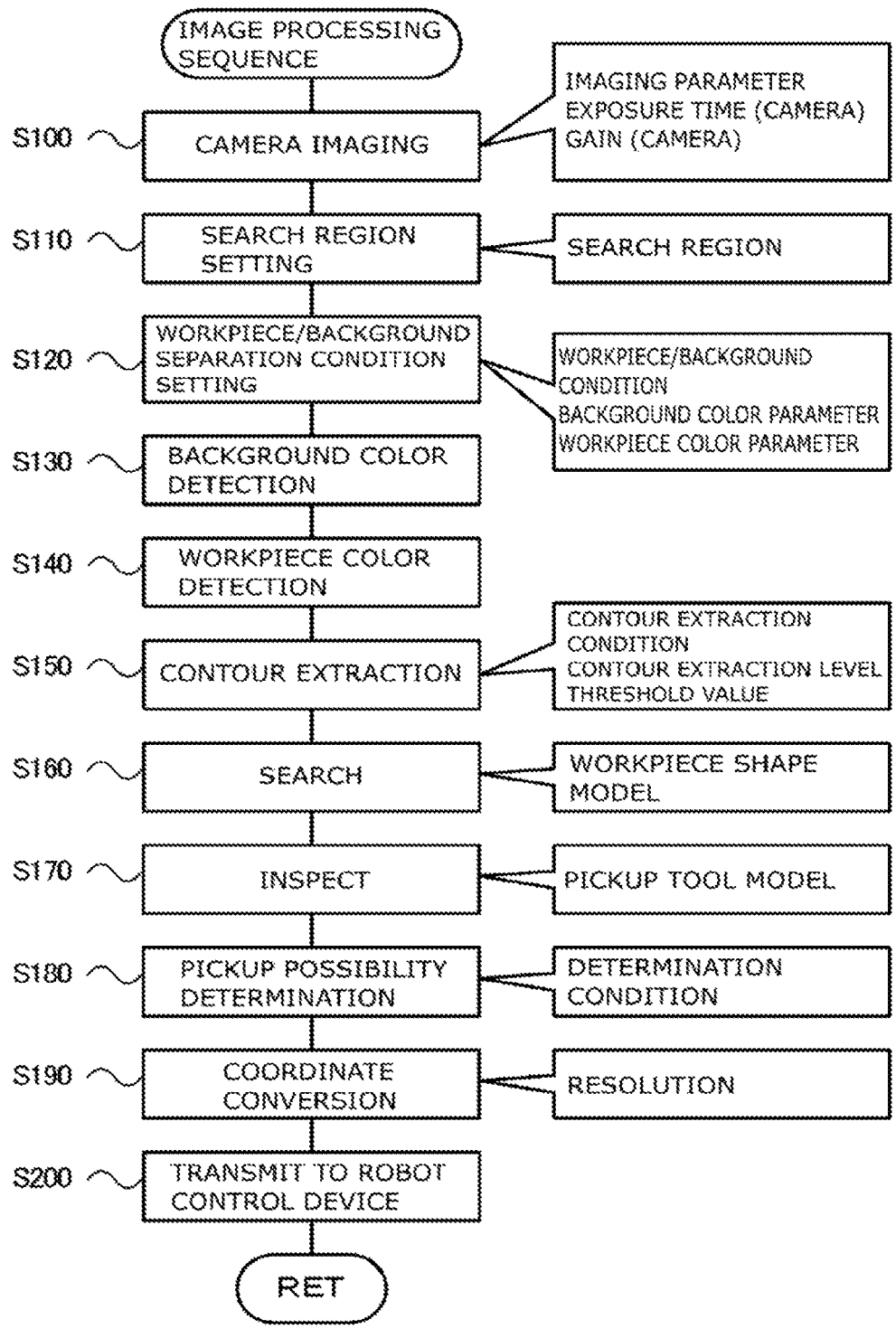
FIG. 9 is an explanatory diagram showing an example of an image-processing sequence.
Figure 10A:
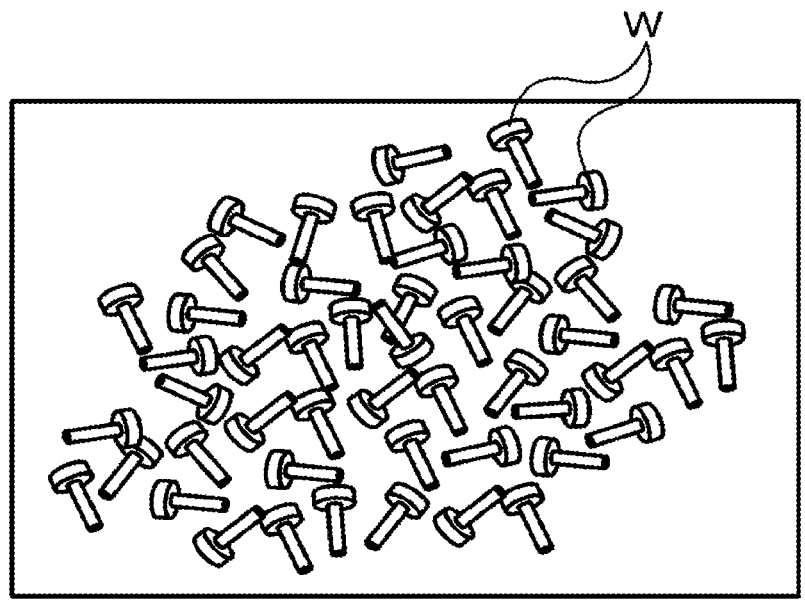
FIG. 10A is an explanatory diagram showing a state of workpieces W and the background when a work supply device is installed at location A.
Figure 10B:
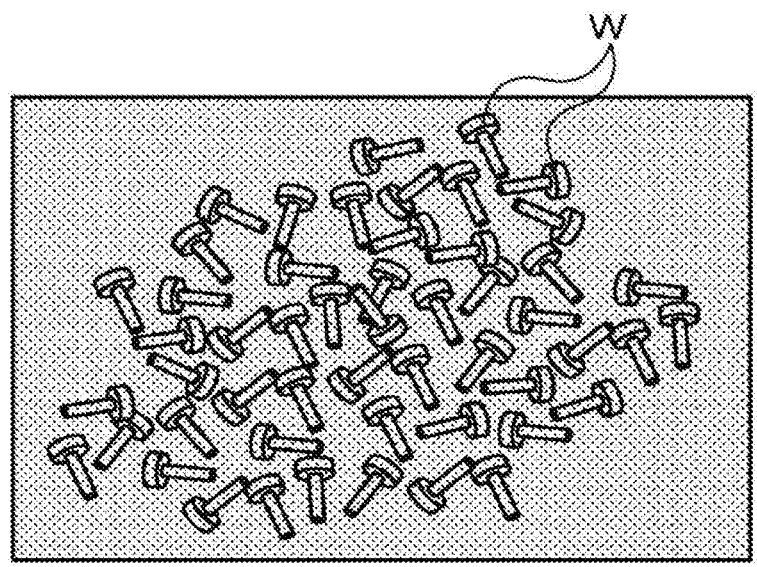
FIG. 10B is an explanatory diagram showing the state of workpiece W and its background when the work supply device is installed at location B.

The image-processing setting model includes an image-processing sequence and parameter settings associated with the image sequence. FIG. 9 is an explanatory diagram showing an example of an image-processing sequence. In the image-processing sequence, image-processing device 80 sets imaging parameters and images workpiece W with camera 24 (S100). The imaging parameter is one of the parameters defined by the parameter setting, and is changed when the lighting conditions change from before, for example, the installation location of robot system 10 is changed, the lighting equipment is changed, or the like. The imaging parameters include light exposure time of camera 24, gain (signal amplification factor), and the like. For example, if the installation location of robot system 10 is changed from location A shown in FIG. 10A to location B shown in FIG. 10B and the lighting is darkened, the light exposure time is adjusted to be longer.

Figure 11A:
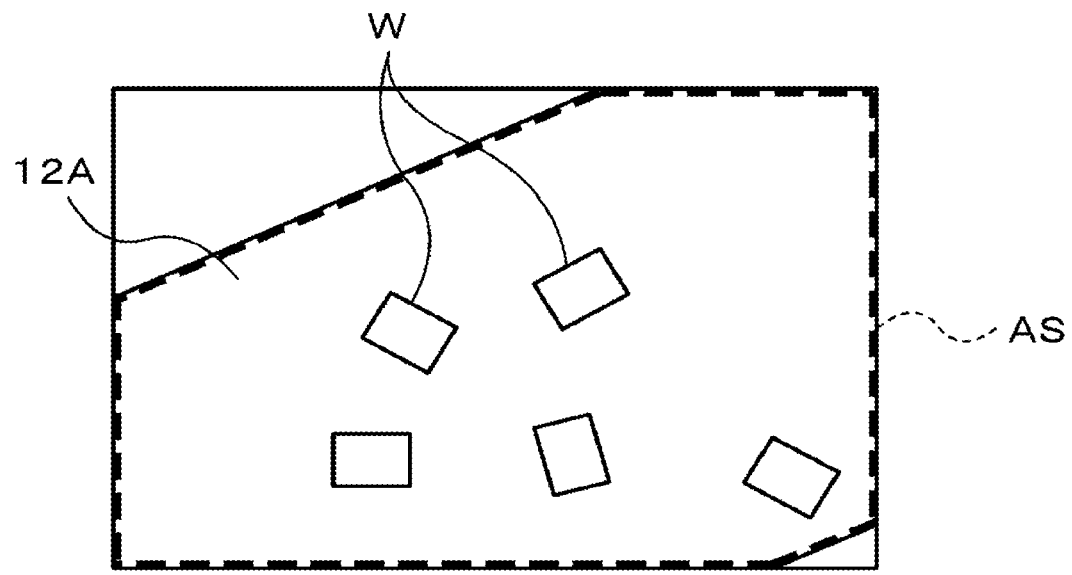
FIG. 11A is an explanatory diagram showing search region AS when workpieces W are supplied by work supply device 12A.
Figure 11B:
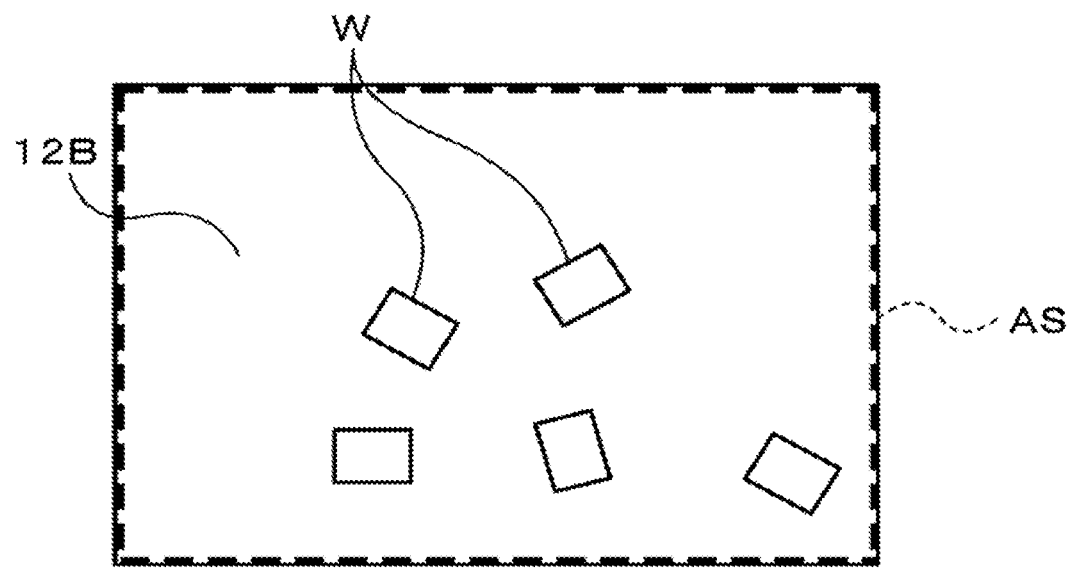
FIG. 11B is an explanatory diagram showing search region AS when workpieces W are supplied by work supply device 12B.

Next, image-processing device 80 sets search region AS in the captured image (S110). Search region AS is one of parameters determined by parameter setting, and defines a search range of workpiece W in the captured image. For example, in work supply device 12A shown in FIG. 11A, since other peripheral devices are included in a part of the imaging region of camera 24, a region excluding the part of the peripheral devices (a region surrounded by a dotted line in FIG. 11A) is set as search region AS. In work supply device 12B shown in FIG. 11B, since the entire imaging region of camera 24 is the background of workpiece W, the entire imaging region (a region surrounded by a dotted line in FIG. 11B) is set to search region AS.

Then, image-processing device 80 sets a workpiece/background condition for separating workpiece W and the background in the captured image (S130), and performs detection (S140) of the background color and detection (S150) of the workpiece color in the search region in accordance with the set workpiece/background condition. The workpiece/background condition is one of parameters determined by parameter setting, and includes a background color parameter designating a background color and a workpiece color parameter designating a workpiece color. The background color parameter is set for each work supply device to be used because the background of workpiece W may be different for each work supply device. The workpiece color parameter is also set for each workpiece W to be used because the color may be different for each workpiece W.

Next, image-processing device 80 performs contour extraction processing for extracting the contour (edges) of workpiece W in accordance with the contour extraction condition (S150). The contour extraction condition is one of parameters determined by parameter setting and includes a threshold used for contour extraction (contour extraction level threshold). Subsequently, image-processing device 80 determines whether the contour shape of the extracted workpiece W substantially matches the workpiece shape model (S160), determines whether another workpiece W is intruding into interference check region AI of extracted workpiece W (S170), and determines whether extracted workpiece W can be picked up based on the determination results (S180). Image-processing device 80 sets the target position and the target orientation of the pickup tool based on pickup position PP of workpiece W determined to be capable of being picked up, and performs coordinate transformation on the set target position and the set target orientation to the target position of motors 51 to 55 (S190). Then, image-processing device 80 transmits the coordinate-transformed target position to robot control device 70 (S200) and ends the image-processing sequence.

Figure 12A:
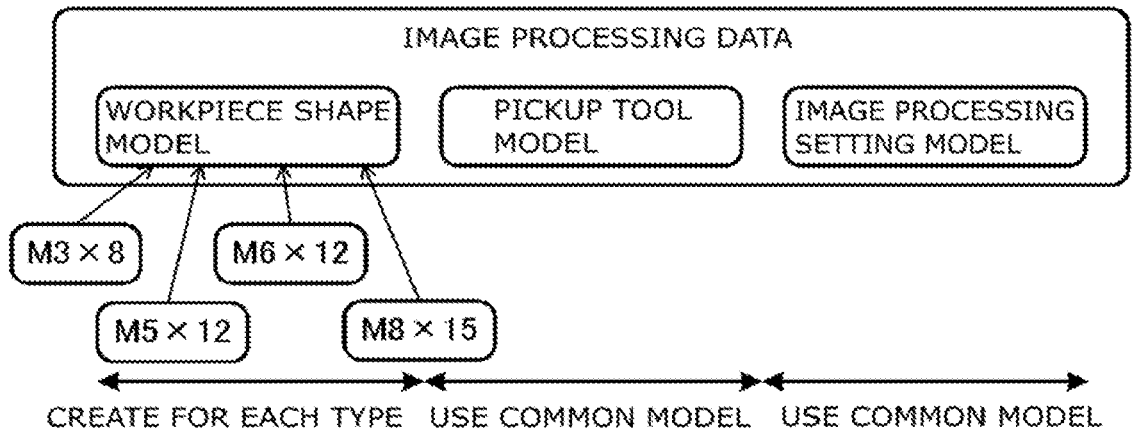
FIG. 12A is an explanatory diagram showing a state in which image-processing data is created by replacing a workpiece shape model.

FIG. 12A is an explanatory diagram showing a state in which image-processing data is created by replacing a workpiece shape model. Now, a case where the pickup method (pickup tool) and the workpiece supply method (work supply device) are set to a common environment, and a case where workpiece (bolt) product type 2 is added will be considered. In this case, the data creator first creates image-processing data necessary for image processing in the case of picking up the original product type 1 (M3×8, for example) and checks the operation. Next, the data creator creates a workpiece shape model with a newly added product type 2 (M5×12, for example). Then, the data creator creates a copy of the image-processing data of the product type 1, replaces only the workpiece shape model from the one of the product type 1 to the one of the product type 2, and stores the copy in HDD 83 of image-processing device 80 as the image-processing data of the product type 2. Finally, the data creator images the product type 1 by changing the arrangement pattern, and performs an image processing test to check that image-processing device 80 can normally recognize the product type 2. The data creator can create image-processing data corresponding to various product types of workpieces with less labor by performing such work every time the type of workpiece is added.

Figure 12B:
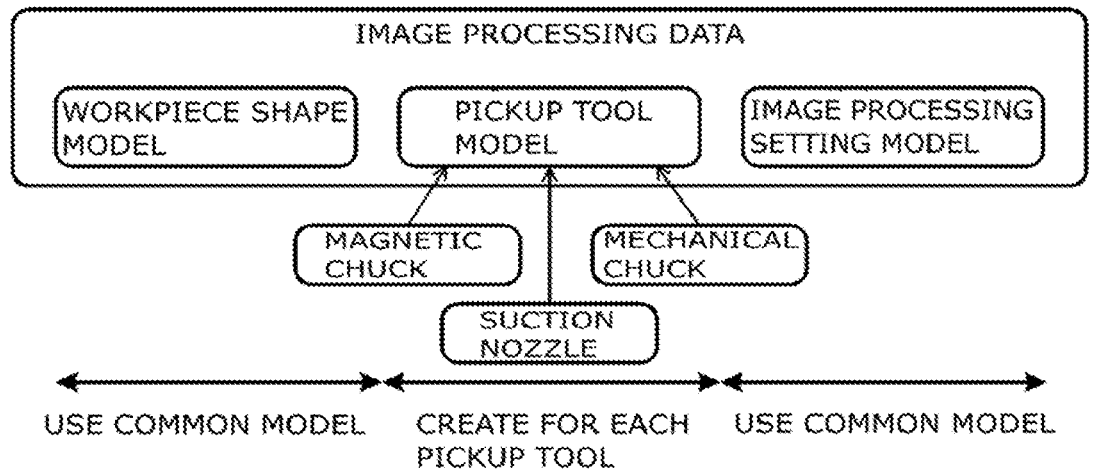
FIG. 12B is an explanatory diagram showing how image-processing data is created by replacing the pickup tool model.

FIG. 12B is an explanatory diagram showing how image-processing data is created by replacing the pickup tool model. Now, a case where the pickup tool is changed from the pickup tool 1 to the pickup tool 2 for the same one workpiece (product type 1) will be considered. The case where the pickup tool is changed may be, for example, a case where the pickup tool is changed from the electromagnetic chuck to the mechanical chuck by changing the workpiece material from the magnetic material (iron) to the nonmagnetic material (stainless steel). Further, the case of changing the pickup tool may be, for example, a case in which the production line produced by using the suction nozzle and the production line produced by using the mechanical chuck are integrated into one line to make the pickup tool common to the mechanical chuck due to the decrease in a production amount and the like. In this case, the data creator first creates image-processing data necessary for image processing in the case of picking up the product type 1 with the pickup tool 1 and checks the operation. Next, the data creator creates a pickup tool model of the pickup tool 2. Then, the data creator creates a copy of the image-processing data of the product type 1/pickup tool 1, replaces only the pickup tool model from the pickup tool 1 to the pickup tool 2, and stores it as the image-processing data of product type 1/pickup tool 2. Finally, the data creator images the product type 1 by changing the arrangement pattern, and performs an image-processing test to check that image-processing device 80 can normally recognize the product type 1. Each time the pickup tool is changed, the data creator can create image-processing data corresponding to various product types with less labor by performing such work.

Figure 12C:
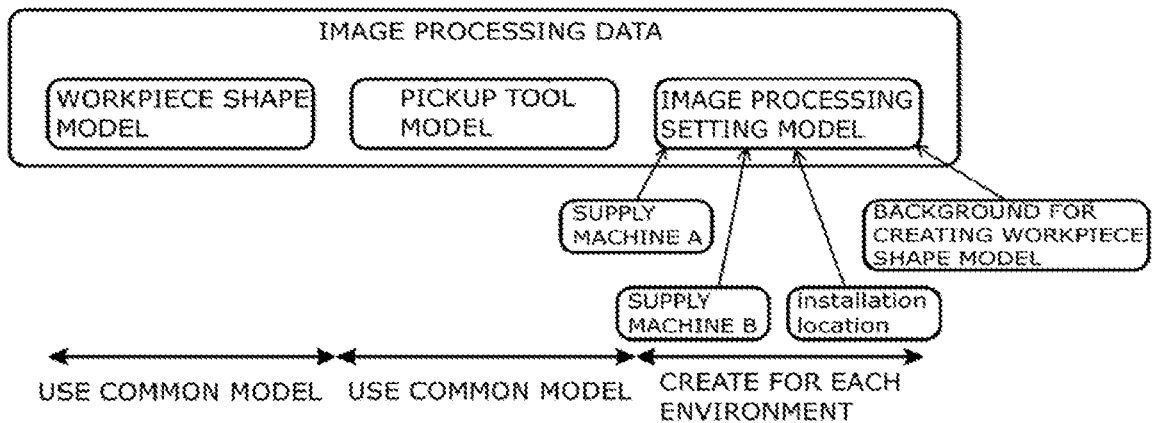
FIG. 12C is an explanatory diagram showing how image-processing data is created by replacing an image-processing setting model.

FIG. 12C is an explanatory diagram showing how image-processing data is created by replacing the image-processing setting model. Now, a case where the environmental condition is changed from the environmental condition 1 to the environmental condition 2 for the same single workpiece (product type 1) will be considered. The case of changing the environmental condition may include, for example, a case of changing the work supply device, a case of changing the installation location of robot system 10, a case of changing the lighting equipment, and the like. Further, the case of changing the environmental condition may be, for example, a case of imaging a workpiece under a background condition different from that at the time of production to create a workpiece shape model. Since the background of the work supply device at the time of production is complicated and it is difficult to extract the contour of the workpiece, the latter case corresponds to the case where the workpiece is imaged with a background of uniform color and brightness at the time of creating the workpiece shape model. First, the data creator creates image-processing data under the product type 1/environmental condition 1 and checks the operation. Next, the data creator creates a copy of the image-processing data of the product type 1/environmental condition 1, performs parameter setting of the image-processing parameters based on the image captured by the camera in the environmental condition 2 based on the created copy, and stores the image-processing data as image-processing data for the product type 1/environmental condition 2. Then, the data creator captures an image by changing the arrangement pattern of the product type 1 under the environmental condition 2 and performs an image-processing test to check that image-processing device 80 can normally recognize the product type 1. The data creator can create the image-processing data corresponding to the change of the environmental condition with less labor by performing such work every time the environmental condition is changed.

In the data structure of the present embodiment described above, the image-processing data is separated into a workpiece shape model, a pickup tool model, and an image-processing setting model, and is composed of a combination thereof. The image-processing data is configured so that models corresponding to each type of workpieces, each type of pickup tool, and each environmental condition of robot system 10 can be freely rearranged. If the data creator creates the image-processing data once, even if any of the types of workpieces, the type of pickup tool, and the environmental condition is changed thereafter, it is only necessary to newly create the item related to the change, and it is possible to easily develop the item to various product type variables. As a result, it is possible to create image-processing data of various product type variables with a small amount of labor.

In the data structure of the present embodiment, the image-processing data is separated into the workpiece shape model, the pickup tool model, and the image-processing setting model, and each model is configured to be recombinable, but only the workpiece shape model and the pickup tool model may be configured to be recombinable. The data structure in this case is preferably employed in a system in which the environmental conditions of robot system 10 do not change.

As described above, the data structure for image-processing data creation of the present disclosure is a data structure for creating image-processing data necessary for performing image processing on captured images of multiple workpieces when an articulated robot extracts a workable target workpiece from among multiple supplied workpieces. The data structure includes workpiece shape data for recognizing the target workpiece by pattern matching and tool data for checking whether there is interference between a tool and a peripheral workpiece, and a combination of the workpiece shape data and the tool data can be rearranged for each workpiece or for each tool.

In the data structure for image-processing data creation of the present disclosure, the workpiece shape data may include an outer shape of the workpiece and a tool work position at which the tool performs work on the workpiece.

Further, in the data structure for image-processing data creation of the present disclosure, the tool data may include an interference prohibition region (interference check region) in which interference of a peripheral workpiece with respect to the target workpiece is prohibited. Thus, even if the tool to be mounted is changed, the articulated robot can appropriately perform the work on the target workpiece without interfering with the peripheral workpiece. In this case, the interference prohibition region may be designated as a region obtained by setting a tool work position at which the tool performs work on the workpiece as a reference. By doing so, it is possible to appropriately link the workpiece shape data and the tool data. Further, in this case, the interference prohibition region may be designated as a circular region or a rectangular region. This makes it possible to create tool data with a smaller amount of data.

The data structure for image-processing data creation of the present disclosure may further include process data including a sequence of the image processing and parameter setting, in which a combination of the process data with the workpiece shape data and the tool data can be rearranged for each environmental condition. In this case, even when the environmental conditions are changed, since the existing data can be used as the workpiece shape data and the tool data by changing only the process data, the image-processing data can be created with a small amount of labor. The environmental condition may include a supply method of the workpiece or a lighting condition of the workpiece.

In the present disclosure, the present disclosure is not limited to the form of the data structure for image-processing data creation, but may be the form of the creation method of image-processing data.

The present disclosure is not limited in any way to the above-mentioned embodiments, and it is needless to say that the present disclosure can be implemented in various forms as long as it belongs to the technical scope of the present disclosure.

INDUSTRIAL APPLICABILITY

The present disclosure can be applied to an image-processing device, a manufacturing industry of an articulated robot, and the like.

REFERENCE SIGNS LIST

10 robot system, 11 work table, 12, 12A, 12B work supply device, 13 conveyor belt, 14 tray conveyance device, 20 robot, 22 arm, 24 camera, 31 first link, 32 second link, 33 third link, 34 fourth link, 35 fifth link, 36 sixth link, 41 first joint, 42 second joint, 43 third joint, 44 fourth joint, 45 fifth joint, 51 to 55 motor, 56 tool actuator, 61 to 65 encoder, 70 robot control device, 71 CPU, 72 ROM, 73 HDD, 74 RAM, 80 image-processing device. 81 CPU. 82 ROM, 83 HDD, 84 RAM, 85 input device, 86 output device, W workpiece, T tray, T1 to T3 pickup tool, PP pickup position. AI interference check region, AS search region.

The invention claimed is:

1. A non-transitory medium storing instructions which when executed by a computer cause the computer to perform a method, the method comprising:
   creating image-processing data necessary for performing image processing on captured images of multiple workpieces when an articulated robot extracts a workable target workpiece from among multiple supplied workpieces based upon a data structure, wherein
   the data structure includes:
       workpiece shape data for recognizing the target workpiece by pattern matching; and
       tool data applicable to each of the multiple supplied workpieces for checking whether there is interference between a tool mounted on the articulated robot and a peripheral workpiece,
   the workpiece shape data for recognizing the target workpiece is usable in first different image-processing data for a different tool other than the tool, and
   the tool data for checking whether there is interference is usable in second different image-processing data for a different workpiece other than the target workpiece.

2. The non-transitory medium according to claim 1, wherein the workpiece shape data includes an outer shape of the workpiece and a tool work position at which the tool performs work on the workpiece.

3. The non-transitory medium according to claim 1, wherein the tool data includes an interference prohibition region in which interference of the peripheral workpiece with respect to the target workpiece is prohibited.

4. The non-transitory medium according to claim 3, wherein the interference prohibition region is designated as a region obtained by setting a tool work position in which the tool performs work on the workpiece as a reference.

5. The non-transitory medium according to claim 4, wherein the interference prohibition region is designated as a circular region or a rectangular region.

6. The non-transitory medium according to claim 1, wherein the data structure further includes:
   process data including a sequence of the image processing and a parameter setting corresponding to an environmental condition, and
   the workpiece shape data for recognizing the target workpiece and the tool data for checking whether there is interference are usable in third different image-processing data for a different environmental condition other than the environmental condition.

7. The non-transitory medium according to claim 6, wherein the environmental condition includes a supply method of the workpiece or a lighting condition of the workpiece.

8. An image-processing data creation method for creating image-processing data necessary for performing image processing on captured images of multiple workpieces when an articulated robot extracts a workable target workpiece from among multiple supplied workpieces, the method comprising:
   creating workpiece shape data for recognizing the target workpiece by pattern matching;
   creating tool data applicable to each of the multiple supplied workpieces for checking whether there is interference between a tool mounted on the articulated robot and a peripheral workpiece in advance;
   creating the image-processing data by combining the workpiece shape data and the tool data; and
   saving the image-processing data, wherein
   the workpiece shape data for recognizing the target workpiece is usable in first different image-processing data for a different tool other than the tool, and
   the tool data for checking whether there is interference is usable in second different image-processing data for a different workpiece than the target workpiece.

9. The image-processing data creation method according to claim 8, wherein the workpiece shape data includes an outer shape of the workpiece and a tool work position at which the tool performs work on the workpiece.

10. The image-processing data creation method according to claim 8, wherein the tool data includes an interference prohibition region in which interference of the peripheral workpiece with respect to the target workpiece is prohibited.

11. The image-processing data creation method according to claim 10, wherein the interference prohibition region is designated as a region obtained by setting a tool work position in which the tool performs work on the workpiece as a reference.

12. The image-processing data creation method according to claim 11, wherein the interference prohibition region is designated as a circular region or a rectangular region.

13. The image-processing data creation method according to claim 8, further comprising:
   creating process data including a sequence of the image processing and a parameter setting corresponding to an environmental condition; and
   creating the image-processing data by combining the workpiece shape data, the tool data, and the process data,
   wherein the workpiece shape data for recognizing the target workpiece and the tool data for checking whether there is interference are usable in third different image-processing data for a different environmental condition other than the environmental condition.

14. The image-processing data creation method according to claim 13, wherein the environmental condition includes a supply method of the workpiece or a lighting condition of the workpiece.

15. The image-processing data creation method according to claim 8, wherein the image-processing data is created before images of the target workpiece are captured for extraction processing to extract the workable target workpiece from among the multiple supplied workpieces.

16. The image-processing data creating method according to claim 8, wherein creating the tool data includes creating tool data for each of a plurality of different types of tool.

17. The image-processing data creation method according to claim 8, wherein creating the workpiece shape data includes creating workpiece shape data for each of a plurality of different types of workpiece.

18. The non-transitory medium according to claim 1, wherein the tool data includes tool data for each of a plurality of different types of tool.

19. The non-transitory medium according to claim 1, wherein the workpiece shape data includes workpiece shape data for each of a plurality of different types of workpiece.

20. The non-transitory medium according to claim 1, wherein
   the workpiece shape data for recognizing the target workpiece is usable without the tool data for checking whether there is interference in the first different image-processing data for the different tool other than the tool, and
   the tool data for checking whether there is interference is usable without the workpiece shape data for recognizing the target workpiece in the second different image-processing data for the different workpiece other than the target workpiece.

* * * * *